Dec. 14, 1971  J. MELILL  3,626,582
FABRICATION OF DIFFUSION BONDED BELLOWS
Filed March 5, 1970  2 Sheets-Sheet 1
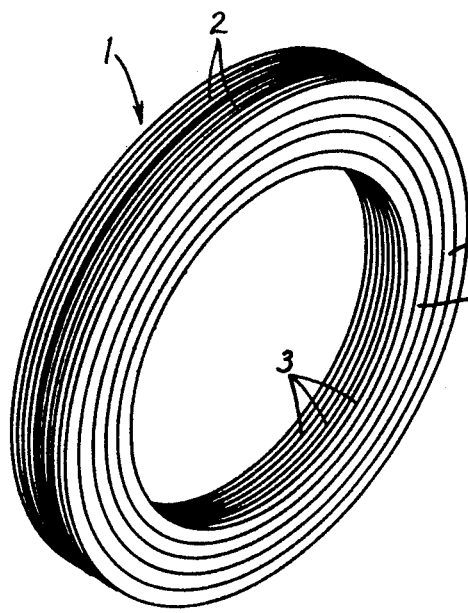
Fig. 1
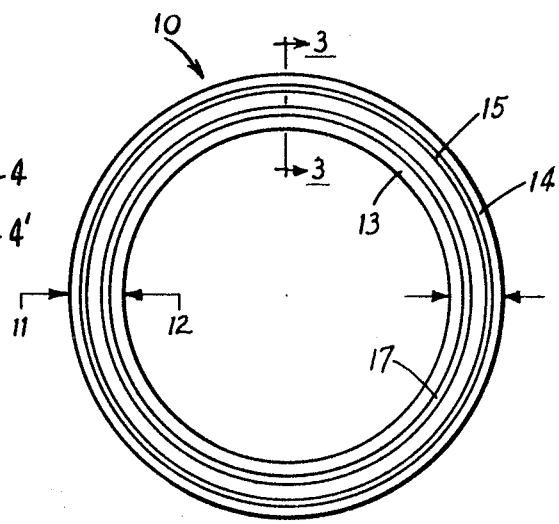
Fig. 2
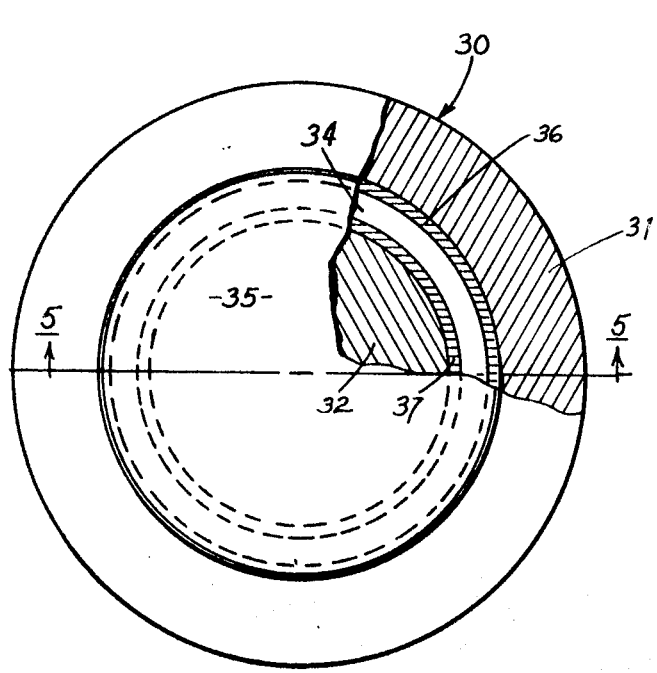
Fig. 4
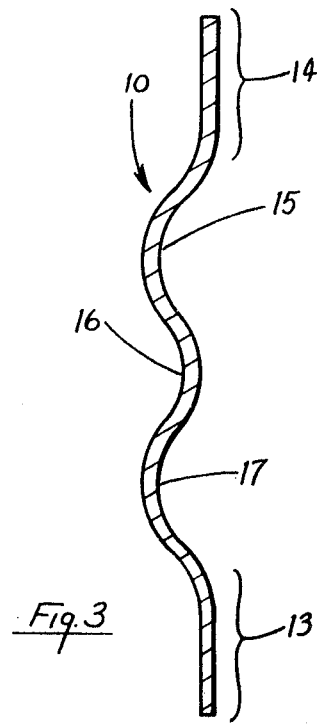
Fig. 3
INVENTOR
JOSEPH MELILL
BY
ATTORNEY United States Patent Office 3,626,582
Patented Dec. 14, 1971

3,626,582
FABRICATION OF DIFFUSION BONDED BELLOWS
Joseph Melill, Rolling Hill Estates, Calif., assignor to North American Rockwell Corporation
Filed Mar. 5, 1970, Ser. No. 16,805
Int. Cl. B23p 19/04
U.S. Cl. 29—454
12 Claims

ABSTRACT OF THE DISCLOSURE

Metal bellows are fabricated by diffusion bonding thin gauge sheet metal annular ring leaves. The multiple annular sheet metal ring leaves are stacked coaxially and simultaneously alternatively joined in pairs by diffusion bonding on the inside and the outside ring diameter land areas. The stacked coaxial assemblage of thin sheet metal annular ring leaves are bonded into accordion-fold, multiple pleated bellows. The fabrication process embodies the use of pressurizing fixture tooling comprising an external steel cylindrical retainer ring and an internal steel cylindrical retainer plug, together with a force transmitting annular ram and multiple thin steel pressure support rings used to transmit the bonding forces of a high pressure ram. The diffusion bonding process requires elevated temperatures of 1600–1700° F. at 500 p.s.i. pressure for 5 hours for typical thin sheet metal titanium annular ring leaves. By properly shaping the inner edge and the external edge of the annular ram transmitting the bonding forces, the clean, alternative outside and inside annular land areas of adjacent pairs of the sheet metal ring leaves are bonded into homogeneous edges of an accordion-fold pleated bellows. The fixture tooling, including the steel force transmitting rings are later removed. Aluminum, stainless steel, titanium, nickel, tantalum, molybdenum, zirconium and columbium thin metal sheet stock may likewise be formed into bellows by this improvement in the fabricating process.

CROSS REFERENCE TO RELATED APPLICATIONS

This application relates to the copending application Ser. No. 634,209, filed Apr. 27, 1967, by the inventors, Carl J. Muser, Joseph Melill, and Joseph C. Lewis.

BACKGROUND OF THE INVENTION

Accordion-fold type pleated bellows are generally made by metal spinning and by metal rolling processes, which require soft, readily deformable metal sheets and tubes as raw material stock for the forming processes. In the aerospace industry sector concerned with the manufacture and flight of large rockets, small savings in weight of components can have a very significant effect upon the successful flight of the large rockets. Significant weight savings can be achieved in some rocket components by using such metals as titanium and the like, instead of steel. Conventional metals from which bellows are made, such as copper alloys, stainless steel, and the like are unsatisfactory for use in rockets either because of corrosion problems or the relatively high weight of the components. Spinnable and rollable metals such as aluminum, or even stainless steel, are not chemically resistant to propellants, and thin titanium sheet stock cannot be readily spun or rolled. Thus the weight saving performance of titanium metal and its chemical resistance to rocket propellants has not been available hitherto, for the fabrication of bellows and other convoluted type components requiring a high degree of formability in their fabrication. The teaching of this advance in the diffusion bonding of thin titanium metal stock to form bellows represents an advance in the fabrication of convoluted components, utilizing metals and alloys which cannot be conveniently rolled or spun.

SUMMARY OF THE INVENTION

Metal bellows are fabricated by diffusion bonding thin gauge sheet metal annular ring leaves. The multiple annular sheet metal ring leaves are stacked coaxially and simultaneously alternatively joined in pairs by diffusion bonding on the inside and the outside ring diameter land areas. The stacked coaxial assemblage of annular thin sheet metal ring leaves are bonded into accordion type multiple pleated bellows. In the fabrication process of this invention, the multiple thin metal leaves are alternatively stacked in pairs, with thin, deformable steel pressure support rings interleaved between the pair of inside leaf land areas and the pair of outside leaf land areas. The stacked leaves and pressure support rings are concentrically disposed in an external steel retainer ring and an internal steel retainer plug, with a force transmitting annular ram coaxially disposed on the stack of leaves. The inner face of the annular ram has a pair of land areas disposed to transmit force to the leaf land areas, through the steel pressure support rings. The diffusion bonding process is completed by typically applying a pressure of 500 p.s.i. at 1600–1700° F., for 5 hours to titanium leaves, forming a homogeneous titanium bellows, with accordion-fold pleats. The pressurizing fixture tooling, including the steel force transmitting rings are later removed. Aluminum, stainless steel, tantalum, molybdenum, zirconium and columbium thin metal sheet stock may likewise be formed into bellows by this improvement in the fabricating process.

Included in the objects of this invention are:
First, to provide an improved process for fabricating an accordion-fold, multiple pleated bellows.
Second, to provide an improved process for manufacturing thin sheet metal stock joined in complex convoluted configurations.
Third, to provide a process for joining by solid state diffusion at elevated pressures, temperatures and required periods of time, sheet metal components which are difficult to fabricate; or which are difficult to fabricate in the required convoluted shape.
Fourth, to provide a process for fabricating thin sheets of metals, which are not suitable for spinning or rolling, into accordion-fold pleated type bellows.
Fifth, to provide a thin titanium metal accordion-fold type multiple pleated bellows.
Sixth, to provide a process for the manufacture of thin, multiple laminated metal components by diffusion bonding.
Further objects and advantages of this invention will become apparent in the following description to be read in conjunction with the accompanying drawing.

BRIEF DESCRIPTION OF THE DRAWING

FIG. 1 is a perspective view of an accordion-fold type pleated bellows formed in this invention.
FIG. 2 is a plan view of a thin sheet metal annular ring leaf component which can be utilized in the manufacturing process of this invention.
FIG. 3 is an enlarged sectional view through 3—3 of FIG. 2.
FIG. 4 is a plan view in partial section showing pressurizing fixture tooling useful in the fabrication process of this invention, showing the tooling components in operative position.

DESCRIPTION OF THE PREFERRED EMBODIMENT

Figure 5:
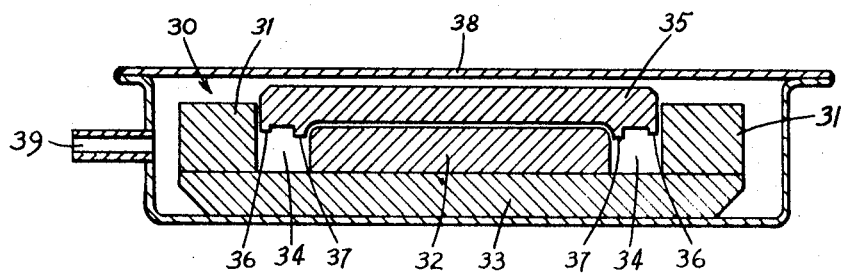
FIG. 5 is a cross sectional view through 5—5 of FIG. 4, without the leaves in fixture of FIG. 4, and enclosed in a retort.

A process is taught for the fabrication of diffusion bonded accordion-fold pleated bellows utilizing thin sheet metal annular ring leaves, particularly of metals difficult to fabricate by known metal rolling and metal spinning processes.

FIG. 1 illustrates in perspective view an accordion-fold pleated type bellows made of thin pure titanium metal, type AMS 4901. The bellows 1 comprises a multiplicity of external annular accordion-fold pleats 2 and a multiplicity of internal annular accordion-fold pleats 3. The crimp annular rings 4 and 4' form flexure rings in each annular pleat of the bellows. By the fabrication process disclosed and taught below, the bellows comprises diffusion bonded, integral leaves, forming the flexible accordion-fold type pleated combination.

FIG. 2 illustrates in a plan view a single thin sheet metal annular ring leaf 10 component of titanium metal. The external diameter 11 of the annular ring leaf 10 and the internal diameter 12 are sized to provide substantially the required diameters for the bellows 1. The annular ring leaf 10 is provided with an external annular land area 13 and an internal annular land area 14, each annular land area being provided as the faying or diffusion bonding area for the diffusion bonding process. The land areas 13 and 14 in FIG. 2 have been drawn on an exaggerated scale in order to clearly indicate their relative positions on the leaf ring of metal, as they are not relatively as wide as the figure indicates. A section through 3—3 of FIG. 2 is further shown enlarged in FIG. 3. The annular ring leaf 10 of metal is shown crimped in cross sectional view, the three joined crimped arcs 15, 16 and 17 provide flexural and expansion functions for the ring leaf. The respective external annular land area 13 and the internal annular land area 14 are shown flat, and suitable for joining to a similar annular land area of another leaf by diffusion bonding.

The single annular ring leaf shown by FIGS. 2 and 3 in combination was made by first blanking 0.010 inch gauge titanium sheet (AMS 4901) stock to form a flat ring of the required dimension. The punching process provides a precision part which can be duplicated to exacting tolerances over thousands of parts. Furthermore, the punching process lends itself to low cost production. The flat punched rings are then each contoured into the cross section of FIG. 3 by matched forming dies. The forming is accomplished at 1080° F. for about 3 minutes under high pressure in a hot sizing press. Before sizing, the leaves are pre-treated with a scale inhibiting compound which also acts as a die lubricant. After hot forming, the cooled completed crimped leaves are vapor degreased and chemically cleaned, and kept clean to provide uncontaminated faying surfaces in the external and internal ring land areas of the ring leaves.

The multiple annular ring leaves of titanium metal are diffusion bonded within the pressurizing fixture tooling 30 of FIG. 4 and FIG. 5. FIG. 4 illustrates the pressurizing fixture tooling 30 in plan view, and FIG. 5 illustrates the same fixture tooling 30 in a cross sectional view shown through 5—5 of FIG. 4. The external metal cylindrical retaining ring 31 of FIG. 4 and the internal retainer plug 32 are shown in partial cross sectional view in FIG. 4 and again in complete cross sectional view in FIG. 5. The external retaining ring 31 and the internal retainer plug 32 are shown concentrically normally disposed on a flat metal base plate 33 in FIG. 5. The concentric disposition of ring 31 and plug 32 provide an annular cylindrical opening 34 disposed between the ring 31 and the plug 32, as shown in plan view in FIG. 4 and in cross sectional detail in FIG. 5. The force transmitting annular ram 35 is slidably, coaxially, aligned in the annular cylindrical opening 34. The ram 35 is also shown in plan view in FIG. 4. The pair of ram annular lands of the ram 35 are shown as the ram annular external land area 36 and the ram internal land area 37 in complete sectional view in FIG. 5, and in partial sectional view in FIG. 4. The thin metal, crushable, evacuable retort 38 is shown enclosing the complete pressurizing fixture tooling 30 in FIG. 5 in order to clarify the relative position of the retort 38 during the diffusion bonding step. The retort 38 has an evacuable opening 39. It will be noted that in both FIGS. 4 and 5 that the annular cylindrical opening 34 does not contain any annular ring leaves 10, in order to simplify the details in the drawing figures.

Figure 6:
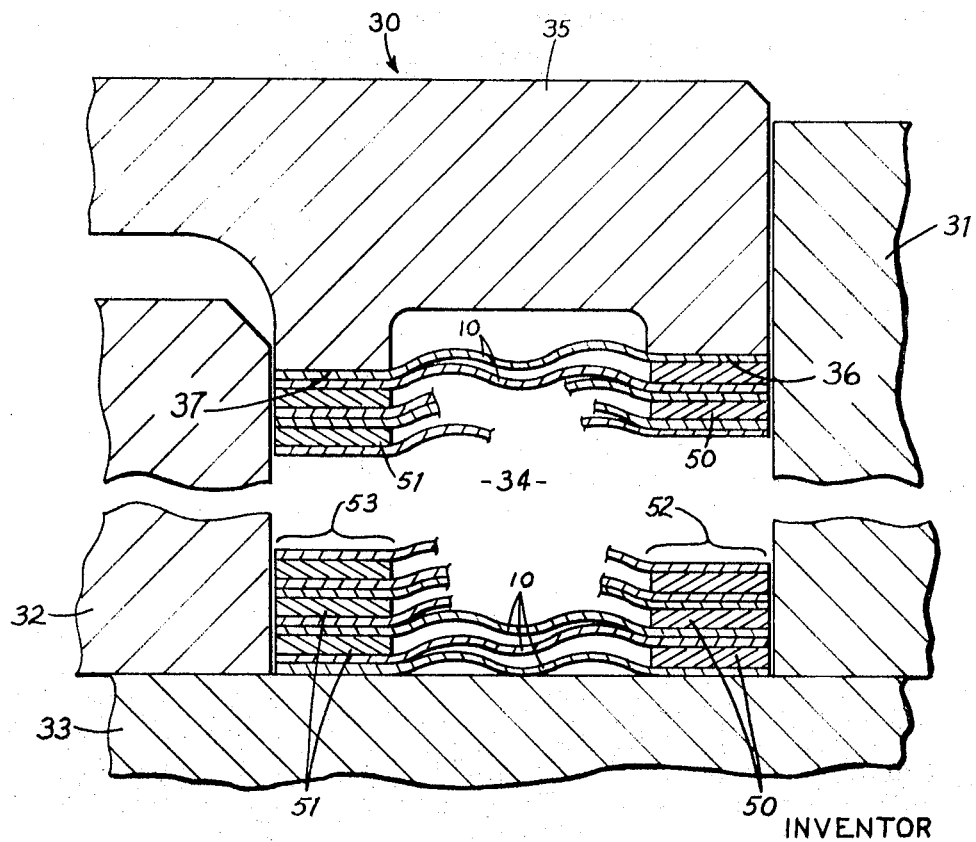
FIG. 6 is an enlarged sectional view through the section 6—6 of FIG. 5 showing the details of the mechanical disposition of leaf components in the pressurizing fixture tooling during the diffusion bonding process.

FIG. 6 illustrates in enlarged detail the configuration of the annular ring leaves 10 and the tooling pressure support rings 50 and 51, which are disposed in fixture tooling 30 prior to the diffusion bonding step. The internal cylindrical retainer plug 32 is shown in partial sectional view normally disposed on the flat metal base 33 and the external cylindrical retaining ring 31 is also normally disposed on the base 33. Slidably fitting into the annular cylindrical opening 34 is the force transmitting annular ram 35, also shown in partial sectional view. The ram 35 has the ram annular external land area 36 and the ram internal land area 37, each land area 36 and 37 having widths 38 and 39 respectively. The ram 35 has been relieved by machining to provide for force transmission only through the land areas 36 and 37. Multiple thin planar annular pressure support rings 50 and 51 are provided as a part of the tooling for the process. The thin planar annular pressure support rings 50 and 51 are provided in two annular diameters, with their accompanying annular land areas. The pressure support rings 50 and 51 are fabricated from carbon steel tooling stock, typically 0.025 inch thick and 0.145 inch land width. Specifically, the external and the internal annular land areas 13 and 14 of the leaf 10, together with the land widths 38 and 39 respectively of the ram annular external land area 36 and the ram internal land area 37, and the respective pressure support ring widths 52 and 53 of rings 50 and 51 are substantially equivalent in their areas. The two sets of diameters of pressure support rings 50 and 51 are fabricated to be equivalent to the two annular land areas 13 and 14 of the leaves 10.

In an assembly step a clean first thin sheet metal annular ring leaf 10 is placed in the bottom of the annular cylindrical opening 34, and a single thin pressure support ring 50 is placed on top of the first leaf 10. The diameter of the pressure support ring tooling may be either selected to match the external annular leaf land area 13 or the internal leaf land area 14, dependent upon the desired bellows construction required. A second annular ring leaf 10 is placed in the annular cylindrical opening 34 on the first pressure support ring 50, indexing the crimps in 15, 16 and 17 in the leaf 10 in the required concave direction, if necessary. A second pressure support ring 51 is placed on top of the second annular ring leaf 10, selecting a pressure support ring of the diameter required to coincide with the annular land area of the adjacent annular ring leaves 10. A third annular ring leaf 10 is disposed on top of the second pressure support ring 51 and a third pressure support ring 50 of the diameter required to secure the adjacent annular ring leaf lands is placed on top of the third ring leaf 10. In this manner a multiple structure of stacked annular ring leaves 10 and multiple pressure support rings 50 and 51 are coaxially aligned within the annular cylindrical opening 34. The terminal annular ring leaf 10 at the top of the stack will accordingly have a pressure support ring secured on either the internal or the external annular land areas 14 and 13 respectively, as required. In the coaxial disposition of the annular ring leaves 10 in the annular cylindrical opening 34, it is required that two adjacent external annular land areas and only two adjacent external annular land areas be separated from other corresponding external and internal annular land areas by from one to two pressure support rings, as required. On the required terminated stack of annular ring leaves 10, together with their pressure support rings 50 and 51, the force transmitting annular ram 35 is coaxially aligned. The ram annular external land area 36 and the ram internal land area 37 are adapted to physically contact the corresponding stacked components on pressurizing, by providing relief in the ram structure to allow it to be freely slidable in the annular cylindrical opening 34.

The pressurizing fixture tooling 30 containing the multiplicity of stacked annular ring leaves 10 and the multiplicity of pressure support rings 50 and 51, is now completely enclosed in the thin metal, crushable, evacuable retort 36 which is hermetically sealed and provided with an evacuable tube opening 39.

Typically, the pure titanium leaves of this embodiment are then heated in the retort with its contained components at 1600–1700° F. and at annular land area pressures of 500 p.s.i. for a period of five hours, while the retort is continuously pressed, and evacuated to remove any reactive components of the atmosphere. The level of land area range of pressure is controlled by the required bond quality and the prevention of undue deformation of the titanium sheet in the faying area of the bond land. As high a pressure as possible is desired to guarantee the integrity of the bond, without deformation or necking of the titanium sheet material. A piece of titanium sheet can be disposed in the top or bottom area of the retort to act as a getter for any reactive atmospheric components which are not removed by evacuation. A conventional press, equipped with thermostatically controlled, heated platens can be used to heat and apply pressure to the retort and its contained fixture tooling.

Typically, bellows have been constructed, with varying number of leaves ranging from 6 to 20 or more, with bellows having internal diameters ranging from 4.3 inches and external diameters of 5.75 inches, up to bellows having inside diameters of 12.3 inches and external diameters of 13.8 inches. Obviously a wide range of bellows internal and external diameters and numbers of accordion-fold pleats can be fabricated by this process.

After the above high temperature and high pressure diffusion bonding step, the retort can be removed from the typical press and allowed to cool. The crushed retort is mechanically removed. The external cylindrical retaining ring and the flat metal base can be mechanically removed, as by precision machining in a lathe. Any precision machining required to finally form precision external diameter on the bellows may then be formed. The internal cylindrical retainer plug may also be removed by machining, and the internal diameter of the bellows finished as desired. The pressure support rings may then be removed from the accordion-fold interstices inside and outside of the bellows by leaching the titanium bellows in hot concentrated nitric acid, dissolving the vestiges of the pressure support rings. The bellows may then be chemically cleaned as desired and made ready for inspection.

The specific bellows embodiment teaches a cylindrical annular bellows cross section. Other bellows cross sections are within the scope of the teaching. A rectangular, square or other cross section can be fabricated, using appropriately shaped leaves corresponding to leaf 10. Obviously, concomitant with a different appropriately shaped leaf 10, or the like, an appropriately shaped outer retaining ring and an inner retainer plug must be correspondingly shaped. Within the teaching herein, the annular ring leaves of the specific embodiment then become annular leaves, and the pressure support rings become pressure support plates.

Although the specific bellows embodiment disclosed utilizes titanium metal, other metals and alloys may be joined by solid-state diffusion bonding. Typical metals which are usefully diffusion bonded are aluminum, stainless steel, titanium, nickel, tantalum, molybdenum, zirconium, and columbium. Diffusion bonding is characterized by interatomic exchange between chemically clean contacting surfaces of work pieces at suitable pressures and at temperatures below the melting point of the work pieces. In general, controlled plastic deformation of the work piece material during the bonding step is advantageous, because plastic deformation will usually accelerate the bonding process. The prior art relating to solid-state or diffusion bonding includes issued U.S. Pats. 3,145,466; 3,180,022; 3,044,160; 2,850,798; and 3,170,234. The precise range of values of time, temperature and pressure utilized in the diffusion bonding step is a function of the specific metal and alloy composition of the work pieces. It is essential for successful diffusion bonding that the ring leaves be chemically clean and that the atmospheric contaminants be removed from the retort during the bonding step, for contaminants in the faying surfaces will be destructive to true diffusion bonding.

The specific embodiment disclosed utilizes similar metal components for diffusion bonding, but dissimilar materials may be utilized. A thin metal interleaf of dissimilar metal may contribute desirably different properties to the bond. The dissimilar metal may form a desirable inter-metallic compound in the diffusion joint. By introducing a concentration gradient in the diffusion bond, an additional driving force for bulk and surface diffusion is provided. By the fabrication process taught in this application, bellows can be successfully bonded, utilizing relatively simple tooling concepts, low pressure and relatively short bond cycles, in order to fabricate bellows from metals which are otherwise extremely difficult to fabricate. The punching process of forming annular ring leaves provides a precision part. The use of precision punched ring leaves and pressure support rings together with an internal cylindrical retainer plug provides for a self-aligning procedure for rapidly stacking component parts within a pressurizing fixture tooling.

Inspection of the fabricated bellows by dye penetrant and by ultrasonic inspection clearly indicates that the bellows can be fabricated with the desired high quality of diffusion bond at the faying surfaces. Bellows were examined by metallographic sections to determine the quality of the bond and the micro structure of the metal, and to detect any indications of possible contamination. The faying surface between the titanium sheets shows a high integrity of the bond area.

The disclosed process for the fabrication of bellows represents an inventive advance in the art, teaching as it does the fabrication of bellows from metals such as titanium and the like which are extremely difficult to form into complex convoluted shapes. Obviously many modifications can be made in this improvement in a process for manufacturing metal bellows from thin sheet metals which are difficult to roll and spin. It is therefore understood that within the scope of the appended claims, the invention may be practiced otherwise than has specifically been described.

I claim:
1. A process for fabricating a metal bellows, comprising:
(a) providing pressurizing fixture tooling by concentrically disposing an external metal retaining ring and and an internal metal retainer plug, each by one normal end of said ring and said plug, on a flat metal base, to form an annular opening in the above described pressurizing fixture tooling,
(b) stacking in said annular opening a clean first thin sheet metal annular leaf adapted to diffusion bonding, said leaf having an external annular land area and an internal annular land area, and each said leaf adapted to self align in said annular opening,

(c) selecting a first non-bonding single, thin, planar annular pressure support plate, said first support plate having a planar land area equivalent to one annular land area selected from said external land area and said internal land area of said leaf, (d) stacking the above said selected pressure support plate on the above said first annular leaf, (e) stacking in said annular opening a clean second said leaf adapted to diffusion bonding, equivalent to said first leaf, (f) stacking in said annular opening a second said pressure support plate having a planar land area equivalent to the annular plate land area opposed to the plate land area covered by said first pressure support plate, (g) then serially alternately stacking in said annular opening multiple pairs of clean leaves and then a pressure support plate, said support plate serially having a planar land area equivalent to the annular land area opposed to the land area covered by the preceding serially stacked pressure support plate, until the desired number of annular leaves are disposed in said annular opening, (h) terminating the serially alternately stacked annular leaves and pressure support plates in said pressurizing fixture tooling with a force transmitting annular ram precisely slidably aligned in said annular opening and having a pair of ram annular land areas, each one of said ram land areas adapted to equivalent contiguous contact with one selected annular land area of an annular leaf, to complete the enclosing pressurizing fixture tooling, (i) further sealing in a thin, crushable metal, evacuable retort, said enclosing pressurizing fixture tooling, (j) evacuating said evacuable retort, to remove all chemically reactive atmospheric components, (k) then diffusion bonding the annular leaves at the contiguous pairs of annular leaf land areas at the elevated temperature, elevated pressure and for the time period required to form a solid-state diffusion joint in the annular leaf land areas, by placing said evacuated retort in said elevated temperature environment and by maintaining said elevated pressure on said enclosed pressure transmitting ram for said required period of time, and (l) then cooling and removing said retort and said pressurizing fixture tooling from the completed diffusion bonded bellows by conventional precision machining and by chemical leaching.

2. In the process set forth in claim 1, the modification wherein:
the annular leaf metals are selected from the faying metals, aluminum, stainless steel, titanium, nickel, molybdenum, zirconium, tantalum and columbium.

3. In the process set forth in claim 1, the modification wherein
the annular leaf metal is titanium.

4. In the process set forth in claim 3, the modification wherein
the titanium annular leaves are diffusion bonded at 1600–1700° F., and a pressure of at least 500 p.s.i., for at least five hours.

5. In a process for fabricating a metal bellows in a pressurizing tooling fixture having a concentrically disposed metal external cylindrical retaining ring and a metal internal cylindrical retainer plug, each disposed by one normal cylindrical end of said ring and said plug, on a flat metal base, to form an annular cylindrical opening in said fixture tooling, the process steps comprising:

(a) stacking in said annular cylindrical opening a clean first thin sheet metal annular ring leaf adapted to diffusion bonding, said ring leaf having an external annular land area and an internal annular land area, and said ring leaf adapted to self align in said annular cylindrical opening, (b) selecting a first non-bonding single, thin, planar annular pressure support ring, said first support ring having a planar land area equivalent to one annular land area selected from said external ring land area and said internal ring land area of said ring leaf, (c) stacking the above said selected pressure support ring on the above said first annular ring leaf, (d) stacking in said annular cylindrical opening a clean second said ring leaf adapted to diffusion bonding, equivalent to said first ring leaf, (e) stacking in said annular cylindrical opening a second said pressure support ring, having a planar land area equivalent to the annular ring land area opposed to the ring land area covered by said first pressure support ring, (f) then serially alternately stacking in said annular cylindrical opening multiple pairs of clean ring leaves and then a pressure support ring, said support ring serially having a planar land area equivalent to the ring annular land area opposed to the ring land area covered by the preceding serially stacked pressure support ring, until the desired number of annular ring leaves are disposed in said annular cylindrical opening, (g) terminating the serially alternately stacked annular ring leaves and pressure support rings in said pressurizing fixture tooling with a force transmitting annular ram precisely slidably aligned in said annular cylindrical opening and having a pair of ram annular land areas, each one of said ram land areas adapted to equivalent contiguous contact with one selected annular land area of an annular ring leaf, to complete the enclosing pressurizing fixture tooling, (h) further sealing in a thin, crushable metal, evacuable retort, said enclosing pressurizing fixture tooling, (i) evacuating said evacuable retort, to remove all chemically reactive atmospheric components, (j) then diffusion bonding the annular ring leaves at the contiguous pairs of annular ring leaf land areas at the elevated temperature, elevated pressure and for the time period required to form a solid-state diffusion joint in the annular ring leaf land areas, by placing said evacuated retort in said elevated temperature environment and by maintaining said elevated pressure on said enclosed pressure transmitting ram for said required period of time, and (l) then cooling and removing said retort and said pressurizing fixture tooling from the completed diffusion bonded bellows by conventional precision machining and by chemical leaching.

6. In the process set forth in claim 5, the modification wherein:
the annular ring leaf metals are selected from the faying metals, aluminum, stainless steel, titanium, nickel, molybdenum, zirconium, tantalum and columbium.

7. In the process set forth in claim 5, the modification wherein
the annular ring leaf metal is titanium.

8. In the process set forth in claim 7, the modification wherein
the titanium annular ring leaves are diffusion bonded at 1600–1700° F., and a pressure of at least 500 p.s.i., for at least five hours.

9. A process for fabricating a metal bellows, comprising:

(a) concentrically disposing a metal external cylindrical retaining ring and a metal internal cylindrical retainer plug, each by one normal cylindrical end of said ring and said plug, on a flat metal base, to form an annular cylindrical opening in the above described pressurizing fixture tooling, (b) stacking in said annular cylindrical opening a clean first thin sheet metal annular ring leaf adapted to diffusion bonding, said ring leaf having an external annular land area and an internal annular land area, and said ring leaf adapted to self align in said annular cylindrical opening,
(c) selecting a first non-bonding single, thin, planar annular pressure support ring, said first support ring having a planar land area equivalent to one annular land area selected from said external ring land area and said internal ring land area of said ring leaf,
(d) stacking the above said selected pressure support ring on the above said first annular ring leaf,
(e) stacking in said annular cylindrical opening a clean second said ring leaf adapted to diffusion bonding, equivalent to said first ring leaf,
(f) stacking in said annular cylindrical opening a second said pressure support ring, having a planar land area equivalent to the annular ring land area opposed to the ring land area covered by said first pressure support ring,
(g) then serially alternately stacking in said annular cylindrical opening multiple pairs of clean ring leaves and then a pressure support ring, said support ring serially having a planar land area equivalent to the ring annular land area opposed to the ring land area covered by the preceding serially stacked pressure support ring, until the desired number of annular ring leaves are disposed in said annular cylindrical opening,
(h) terminating the serially alternately stacked annular ring leaves and pressure support rings in said pressurizing fixture tooling with a force transmitting annular ram precisely slidably aligned in said annular cylindrical opening and having a pair of ram annular land areas, each one of said ram land areas adapted to equivalent contiguous contact with one selected annular land area of an annular ring leaf, to complete the enclosing pressurizing fixture tooling,
(i) further sealing in a thin, crushable metal, evacuable retort, said enclosing pressurizing fixture tooling,
(j) evacuating said evacuable retort, to remove all chemically reactive atmospheric components,
(k) then diffusion bonding the annular ring leaves at the contiguous pairs of annular ring leaf land areas at the elevated temperature, elevated pressure and for the time period required to form a solid-state diffusion joint in the annular ring leaf land areas, by placing said evacuated retort in said elevated temperature environment and by maintaining said elevated pressure on said enclosed pressure transmitting ram for said required period of time, and
(l) then cooling and removing said retort and said pressurizing fixture tooling from the completed diffusion bonded bellows by conventional precision machining and by chemical leaching.

10. In the process set forth in claim 9, the modification wherein:
the annular ring leaf metals are selected from the faying metals, aluminum, stainless steel, titanium, nickel, molybdenum, zirconium, tantalum and columbium.

11. In the process set forth in claim 9, the modification wherein
the annular ring leaf metal is titanium.

12. In the process set forth in claim 11, the modification wherein
the titanium annular ring leaves are diffusion bonded at 1600–1700° F., and a pressure of at least 500 p.s.i., for at least five hours.

References Cited

UNITED STATES PATENTS

| | | | |
|---|---|---|---|
| 3,270,905 | 9/1966 | Kreekel | 29—454 X |
| 3,514,842 | 6/1970 | Beuyukian et al. | 29—471.1 X |
| 3,550,254 | 12/1970 | Greenspan et al. | 29—472.3 X |
| 3,482,302 | 12/1969 | Williams | 29—454 |
| 1,717,196 | 6/1929 | Emmet | 113—116 B |

JOHN F. CAMPBELL, Primary Examiner

R. B. LAZARUS, Assistant Examiner

U.S. Cl. X.R.

29—472.1, 472.3, 497.5; 113—116